W. J. SLEFFEL.
SLIDING SEAT.
APPLICATION FILED DEC. 27, 1911.
1,067,789.
Patented July 15, 1913.
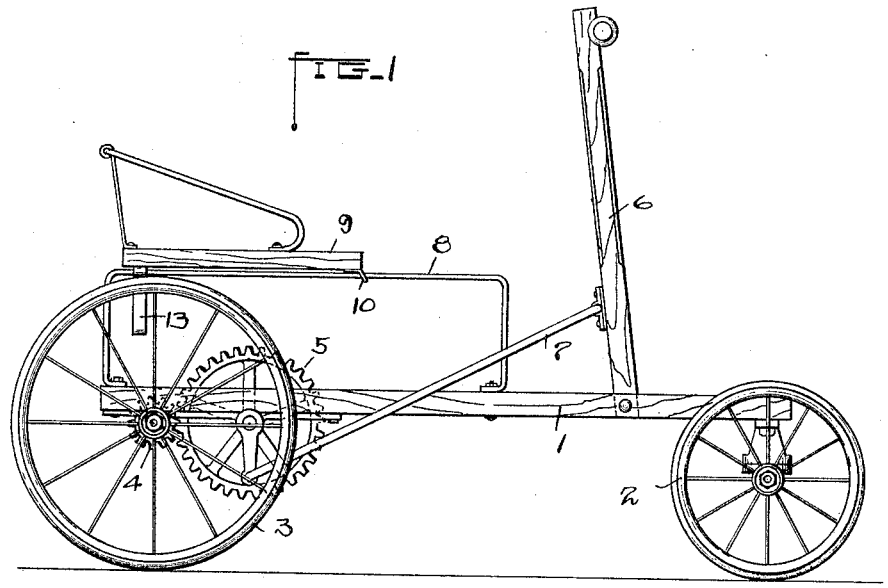
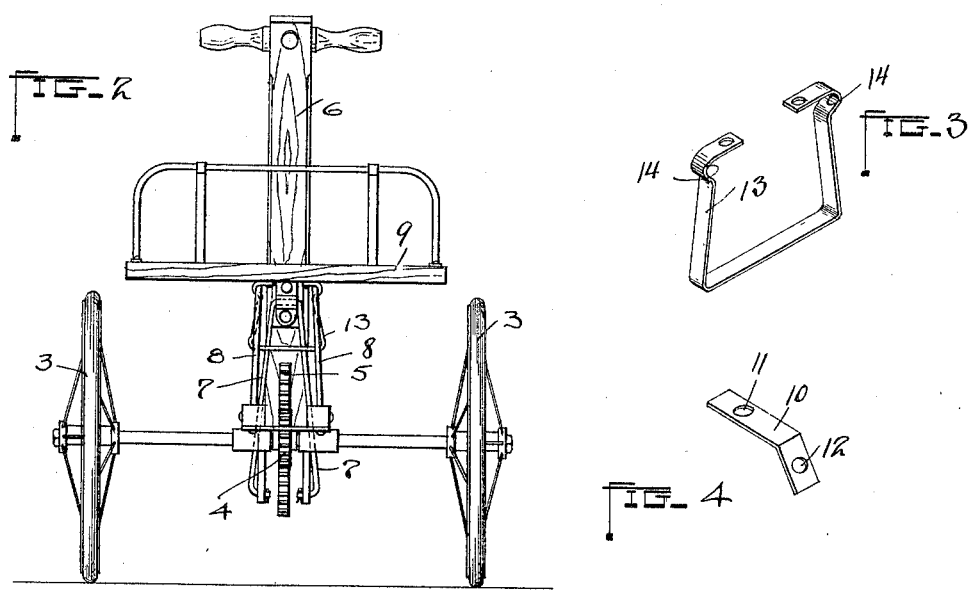
WITNESSES:
Oliver M. Kappler.
Horace B. Fay
INVENTOR
William J. Sleffel
BY J. B. Fay
ATTORNEY

UNITED STATES PATENT OFFICE.

WILLIAM J. SLEFFEL, OF CLEVELAND, OHIO, ASSIGNOR TO THE KIRK-LATTY MANUFACTURING COMPANY, OF CLEVELAND, OHIO, A CORPORATION OF OHIO.

SLIDING SEAT.

1,067,789.　　　　　Specification of Letters Patent.　　Patented July 15, 1913.

Application filed December 27, 1911. Serial No. 668,128.

*To all whom it may concern:*

Be it known that I, WILLIAM J. SLEFFEL, a citizen of the United States, and a resident of Cleveland, county of Cuyahoga, and State of Ohio, have invented a new and useful Improvement in Sliding Seats, of which the following is a specification, the principle of the invention being herein explained and the best mode in which I have contemplated applying that principle, so as to distinguish it from other inventions.

The object of my invention is the provision of an extremely simple sliding or adjustable seat which can be operated without excessive trouble.

My device is extremely simple in construction and for this reason will be particularly adapted to use on children's vehicles such as " go-carts ", automobiles and the like. It is of course not confined exclusively to any such use but may be used on various other vehicles or for other purposes.

To the accomplishment of these and related ends, said invention then consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing: Figure 1 is a side elevation of a child's automobile having my improved seat attached thereto; Fig. 2 is a rear elevation of the same; and Figs. 3 and 4 are views in perspective of details of the construction.

In Fig. 1 is shown a child's automobile comprising a frame 1, front wheels 2 and rear wheels 3. Attached to the latter is a gear wheel 4 adapted to be driven by means of the large gear wheel 5 operated by the handle 6 through the rod 7. The general construction of the automobile will be readily apparent and no further description of the same is considered necessary. The seat is attached to the same for illustrative purposes only. Upon the frame 1 are mounted two parallel flexible members 8 which are preferably of circular cross-section and support a seat 9 having lugs 10 projecting downwardly from one end thereof. The lug 10 has two holes in it, one, 11, being adapted to receive a pin or screw for fastening the same to the bottom of the seat, the other, 12, being in the downwardly extending portion of the lug and being adapted to receive the member 8. Two of these lugs are used, one for each of the members 8 and the holes 12 will be bored through the lugs at right angles to the face of the downwardly projecting part. These holes will be of substantially the same size as the members 8 and when concentric therewith will permit the movement of the seat along the members. By reason of the close fit of the members in these holes, when the seat is in position shown in Fig. 1, the holes will exert a secure grip upon the members 8, securely retaining the seat against the movement along the members. The weight of the occupant of the seat will of course be sufficient to hold the same in its normal position parallel to the members 8, but I further provide a resilient loop 13 which is attached to the rear end of the seat and incloses the two members 8 as shown in Fig. 2. The action of the loop 13 is to grip the two members 8 resiliently, thus securely retaining the same in the slots 14 at the outer sides of the loop. The seat may be raised by pressing the two members together and pulling upwardly on the rear of the seat, when the seat may be held at a sufficient angle to permit movement of the same along the members 8.

The lugs are formed of comparatively thin sheet metal and are therefore sufficiently resilient to enable them to secure a resilient and very firm grip upon the supports 8 when the seat 9 is tilted into a fixed position on the supports. By this construction there is a double security against movement of the seat along the supports when it is in a fixed position. The resiliency of the supports 8 tends to prevent this movement irrespective of the construction of the lugs 10, while the resiliency of the latter members also tends to prevent movement along the supports whether the supports are themselves resilient or the reverse.

The present seat possesses several advantages over the usual type of sliding seat. It is extremely simple in construction yet gives a most secure locking action when adjusted in any position. The weight of the occupant of the seat exerts the greater part of the force used in the locking action, the loop supplying merely enough pressure to retain the seat in position when the occupant rises. By thus utilizing the weight of the occupant to hold the seat in the desired position, it is possible to eliminate the usual force used and the adjustment is made considerably easier.

The above named advantages are combined with comparative cheapness, secured by the simplicity, and adapt my seat to all uses requiring a rapid acting but simple seat.

It will be a matter of indifference whether the means for holding the seat in its normal position take the form of a loop 13, or something else. The function to be performed is the retaining of the seat in its fixed position and any suitable means may be used. A second function of the loop is to indicate that tilted position of the seat in which it may be freely adjusted along the flexible members. In one such position, and only one, will the holes in the lugs be concentric with the members, and while there will be some play it will be inconvenient to adjust the seat except when the holes are concentric with the lugs, by reason of the friction between the same in all other positions. The size of the loop will be so calculated that when the bottom of the loop strikes the members the seat will then be freely adjustable and the sides of the loop are inclined toward each sufficiently to frictionally grip the members enough to prevent the seat from falling of its weight to a position where the lugs will begin to engage the members. At the same time this frictional grip will be so small that no trouble will be experienced in adjusting the seat along the members.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The combination of a resilient fixed member, a seat adapted to slide thereon, said seat lying normally parallel to said member; an apertured lug mounted on said seat and adapted to grip said member on either side at points not opposite one another when said seat is in its normal position, thereby operating with said resilient member to provide a secure resilient engagement between said seat and said member.

2. The combination of a resilient fixed member, a seat adapted to slide thereon, said seat lying normally parallel to said member; a lug mounted at one end of said seat at an angle to said member when said seat is in its normal position, said lug being provided with an aperture adapted to receive said member, said lug being adapted to coöperate with said member to provide a resilient engagement between said seat and member when said seat is in normal position.

3. The combination with two fixed flexible members disposed parallel to each other, of a seat adapted to slide thereon, said seat lying normally parallel to said member; two downwardly projecting lugs attached at one end to said seat, said lugs having holes therein adapted to receive said member, and in the normal position of said seat, to securely grip said members; and a flexible loop attached to the other end of said seat and adapted to resiliently engage said member, thereby retaining said seat in its normal position.

4. The combination of two fixed flexible rods disposed parallel to each other; a seat adapted to slide thereon, said seat lying normally parallel to said two members; two downwardly projecting lugs attached at one end to said seat, said lugs having holes therein adapted to receive said members, and in the normal or operative position of said seat to securely grip the same; and means automatically operated by the movement of said seat into its operative position, and adapted to retain said seat in such position.

5. The combination of two fixed flexible rods disposed parallel to each other; a seat adapted to slide thereon, said seat lying normally parallel to said two members; two downwardly projecting lugs attached at one end to said seat, said lugs having holes therein adapted to receive said members, and in the normal or operative position of said seat to securely grip the same; and a flexible loop attached to the other end of said seat, and extending around said rods, said loop being formed with inwardly projecting shoulders adapted to engage beneath said rods when said seat is moved into its operative position, thereby resiliently retaining said seat in such position.

6. The combination of two substantially parallel supports; a seat adapted to slide thereon; means adapted to secure said seat to said supports when said seat is moved to a given position relative to said supports; and a flexible loop attached to said seat and extending past said supports, said loop being formed with shoulders adapted to engage beneath said supports, thereby retaining said seat in such fixed position on said supports.

7. The combination of two substantially parallel but relatively movable supports; a seat adapted to slide thereon; means adapted to secure said seat to said supports when said seat is moved to a given position relative to said supports; and a loop attached to said seat and extending past said supports, said loop being formed with shoulders adapted to engage beneath said supports when the latter are moved relatively to each other, thereby retaining said seat in such fixed position on said supports.

Signed by me this 21st day of December, 1911.

WILLIAM J. SLEFFEL.

Attested by—
FREDERICK H. McISAAC,
HARRY D. REED.

Copies of this patent may be obtained for five cents each, by addressing the "Commissioner of Patents, Washington, D. C."